(12) United States Patent
Fiebrich et al.

(10) Patent No.: US 7,692,912 B2
(45) Date of Patent: Apr. 6, 2010

(54) SYSTEM AND METHOD FOR INFORMATION HANDLING SYSTEM DISPLAY BACKLIGHT PROTECTION AND MONITORING

(75) Inventors: Greg R. Fiebrich, Georgetown, TX (US); Erin L. Price, Pflugerville, TX (US); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 12/061,830

(22) Filed: Apr. 3, 2008

(65) Prior Publication Data

US 2009/0251837 A1 Oct. 8, 2009

(51) Int. Cl.
*H02H 3/08* (2006.01)
(52) U.S. Cl. .................................... 361/93.9
(58) Field of Classification Search ............... 361/93.9, 361/90; 315/307; 345/102; 349/61; 713/300, 713/324
See application file for complete search history.

(56) References Cited

U.S. PATENT DOCUMENTS

| | | | |
|---|---|---|---|
| 6,496,236 B1 * | 12/2002 | Cole et al. .................... 349/61 |
| 6,943,770 B2 * | 9/2005 | Garcia et al. ................. 345/102 |
| 7,124,313 B1 * | 10/2006 | Motohashi ................... 713/324 |
| 7,262,752 B2 | 8/2007 | Weindorf | |
| 2006/0072265 A1 * | 4/2006 | Bucella et al. ................ 361/90 |
| 2006/0238181 A1 * | 10/2006 | Luo et al. ..................... 323/282 |
| 2007/0075653 A1 | 4/2007 | Nishinosono | |
| 2007/0079153 A1 * | 4/2007 | Bain et al. ................... 713/300 |
| 2007/0120808 A1 * | 5/2007 | Shimoda et al. ............. 345/102 |
| 2007/0159750 A1 | 7/2007 | Peker et al. | |

\* cited by examiner

*Primary Examiner*—Stephen W Jackson
*Assistant Examiner*—Angela Brooks
(74) *Attorney, Agent, or Firm*—Hamilton & Terrile, LLP; Robert W. Holland

(57) ABSTRACT

A current limiting MOSFET monitors power applied to a direct current boost regulator that powers an LED backlight to automatically shut off power to the boost regulator if the current exceeds a predetermined amount. An embedded controller interfaces with the current limiting MOSFET for normal control of operation of the boost regulator by turning the MOSFET on and off. An overcurrent alert is communicated from the MOSFET to the embedded controller if the current exceeds the predetermined amount so that the embedded controller shuts off power to the boost regulator and indicates the failure to an end user.

20 Claims, 2 Drawing Sheets

SYSTEM AND METHOD FOR INFORMATION HANDLING SYSTEM DISPLAY BACKLIGHT PROTECTION AND MONITORING

BACKGROUND OF THE INVENTION

1. Field of the Invention

The present invention relates in general to the field of information handling system integrated displays, and more particularly to a system and method for information handling system display backlight protection and monitoring.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As enterprises and individuals have grown more reliant on information handling systems, portable information handling systems have become more and more common. Portable information handling systems include an integrated display, such as a liquid crystal display (LCD), an integrated power source, such as a battery, and integrated I/O devices, such as a keyboard so that the systems operate free from hard connections, such as power outlets or external peripherals. Portable information handling systems having wireless capabilities allow end users to communicate from virtually any location that is within reach of a wireless local area network, such as Wi-Fi hotspots, or a wireless wide area network, such as a cellular phone network. Two considerations that end users tend to take into account when purchasing a portable information handling system are the size of the system and the time that the system will operate on battery power before needing to recharge. Smaller portable information handling systems typically weigh less than larger systems and are thus easier to carry and use on the go, however, smaller systems tend to have less room to hold processing components and thus tend to have less processing capability. Although larger systems generally have more room for more capable processing components, components that are more capable tend to use more power, which leads to less operating time on a given battery charge.

One example of a portable information handling system component that impacts size and power consumption of a system is the backlight used to provide illumination behind an LCD panel. Traditionally, cold cathode fluorescent lamps (CCFL) have provided backlight for LCD panels. CCFLs are powered with relatively high voltage alternating currents of up to 1000V provided from an inverter that converts the typical 12V direct current of the system power source. CCFLs are relatively inexpensive and proven components although CCFL inverters are somewhat complex and often include a microcontroller to manage the generation of alternating currents. In contrast to CCFLs, light emitting diode (LED) backlights are a relatively new alternative that illuminate an LCD panel with direct current voltage of approximately 40V provided from a boost regulator. LED backlights provide an energy efficient light source with a reduced footprint for use in smaller portable information handling systems. The boost regulator used to power an LED backlight is typically simpler than the inverter used to power a CCFL backlight. Indeed, a boost regulator is typically a simple analog circuit. The boost regulator and inverter generally lack intelligence to detect and report faults associated with the backlight, however, inverters typically have inherent safety features not found in boost regulators. Since the boost regulator usually operates from the main system power bus, a component failure can bring down the main power rail and cause a system shutdown, even potentially latching the external power adapter if it is plugged in. One option to detect such a fault is to have a fuse blow if an over current occurs, but a blown fuse disables the system and does not provide feedback of the fault. Another option is to integrate a switch in the boost regulator that turns off if current exceeds a preset value, but such a switch is costly and increases power use.

SUMMARY OF THE INVENTION

Therefore, a need has arisen for a system and method that protects and monitors LED backlight systems.

In accordance with the present invention, a system and method are provided which substantially reduce the disadvantages and problems associated with previous methods and systems for protecting and monitoring LED backlight systems. A current limiting switch provides power to an LED power regulator so that power is shut off to the regulator by the current limiting switch if current drawn by the regulator exceeds a threshold associated with an over current fault.

More specifically, an information handling system has plural processing components disposed on a motherboard that cooperate to process information, such as a CPU, RAM, a chipset and an embedded controller. Information is presented at the information handling system by an LCD panel that generates visual information. The information is illuminated with a backlight having plural LEDs. A boost regulator provides power to the LEDs to illuminate by boosting a system voltage from a direct current power source to a voltage level used by the LEDs. A current limiting MOSFET is disposed on the motherboard between the power source and the boost regulator. At a predetermined current limit, the current limiting MOSFET cuts off power to the boost regulator. Once the current limiting MOSFET detects an overcurrent event, a flag is communicated to the embedded controller to shut off power at the current limiting MOSFET and to provide notification of the overcurrent event through a power regulation monitor.

The present invention provides a number of important technical advantages. One example of an important technical advantage is that an LED backlight system has protection against faults and monitoring to track and report faults. A current limiting MOSFET prevents current over a predetermined amount from entering the backlight system by shutting off power to the backlight system if a current threshold is reached. The current limiting MOSFET resides on the motherboard to monitor power to the backlight system so that power consumption of the backlight system is not increased by a switch internal to the boost regulator. The current limiting MOSFET provides a logic flag output to indicate when an over current condition occurs so that a fault event is logged and notice of a fault is provided to an end user. A fault indication system supported at an embedded controller of the information handling system provides access to fault information even if a failure of the backlight system disables the display of the information handling system. The current limiting MOSFET replaces soft-start and enable circuits that are otherwise used to provide power to the boost regulator so that the cost of protection and monitoring is minimal.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

A current limiting MOSFET disposed between a power source and LED system of an information handling system provides protection from and monitoring of over current situations. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
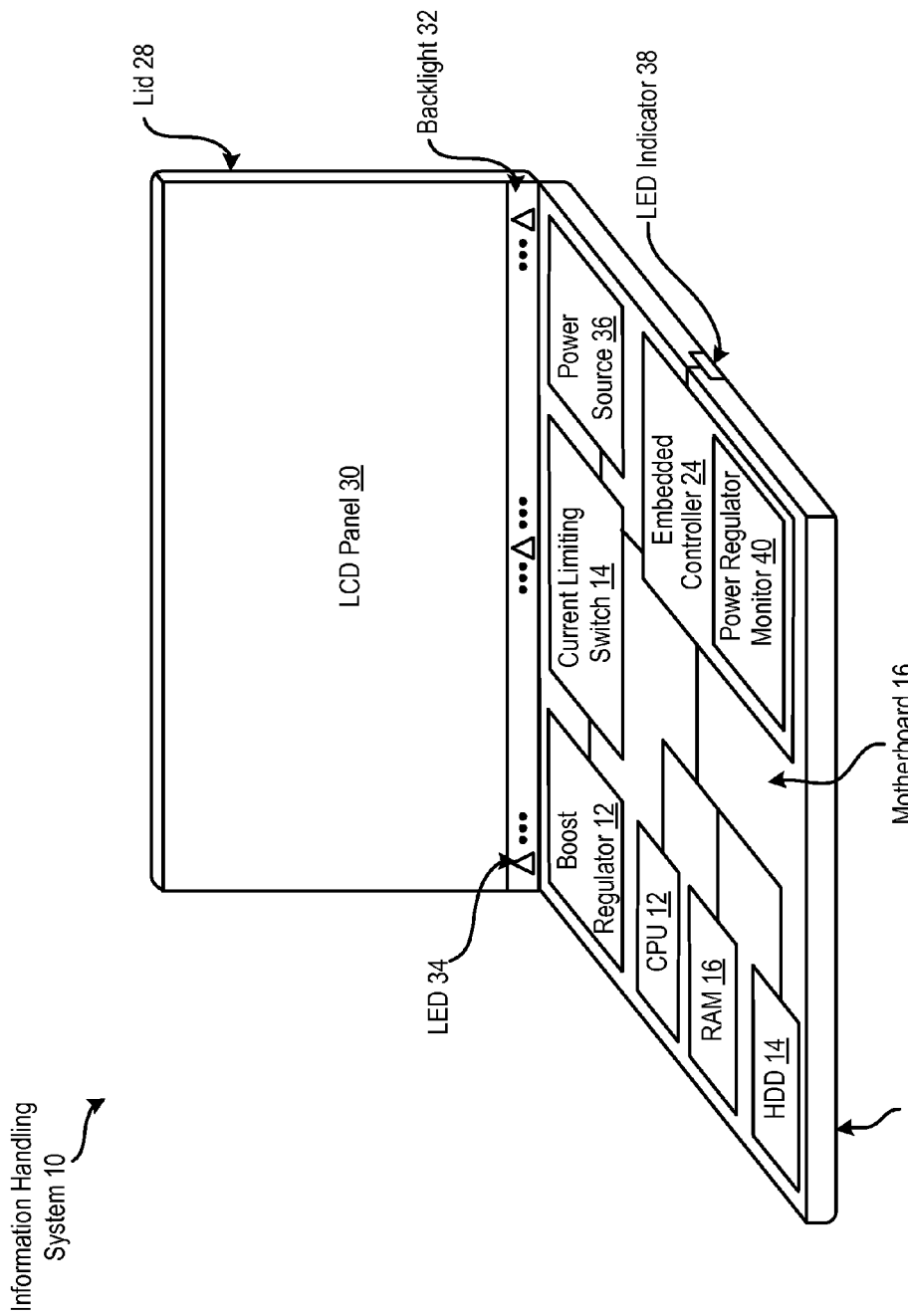
FIG. 1 depicts a block diagram of a portable information handling system having an LED backlight boost regulator protected with a current limiting switch.

Referring now to FIG. 1, a block diagram depicts a portable information handling system 10 having an LED backlight boost regulator 12 protected with a current limiting switch 14. Information handling system 10 has a plurality of processing components that cooperate to process information and that are disposed on a motherboard 16, such as a CPU 18, RAM 20, a chipset 22, and an embedded controller 24. Motherboard 16 is supported in a chassis 26 having a rotationally coupled lid 28 that rotates between an open position and a closed position. An LCD panel 30 integrated in lid 28 presents information received from the processing components as visual images. A backlight 32 provides illumination at the back of LCD panel 30 to make the visual images visible to an end user. Backlight 32 illuminates the back of LCD panel 30 with a plurality of LEDs, such as white LEDs (WLEDs) or red, green, blue LEDs (RGB LEDs). LEDs 34 illuminate with direct current provided from a power source 36 through current limiting switch 14 and boost regulator 12. Boost regulator 12 boosts the voltage provided from power source 36 from a system level, such as 12V, to a level used by LEDs 34, such as 40V. In alternative embodiments, boost regulator 12 might be included within LCD panel 30. In alternative embodiments, LCD panel 30 might be in a separate display device, such as an external monitor or an LCD television.

Current limiting switch 14 is, for example, a current limiting MOSFET that switches off current to boost regulator 12 if the current exceeds a predetermined threshold, such as the maximum current that LEDs 34 are expected to draw under normal operations. Current limiting switch 14 is separate from boost regulator 12, and interfaced with embedded controller 24, so that embedded controller 24 commands switch 14 open and closed during normal operations to apply power to or remove power from boost regulator 12. Current limiting switch 14 sends an overcurrent alert to embedded controller 24 in the event that an overcurrent condition is detected. Upon receipt of an overcurrent alert, a power regulator monitor 40 running on embedded controller 24 can command removal of power from power source 36 to current limiting switch 14 and provides an indication of the overcurrent condition to an end user of information handling system 10. For example, power regulator monitor 40 illuminates an LED indicator 38 to provide a visual indication of the overcurrent condition. As an alternative, power regulator monitor 40 initiates a message describing the fault through a network to a network location that an end user can view from another information handling system having an operational display. As another alternative, power regulator monitor 40 presents over current fault information at a peripheral display interfaced through an external connector of information handling system 10.

Figure 2:
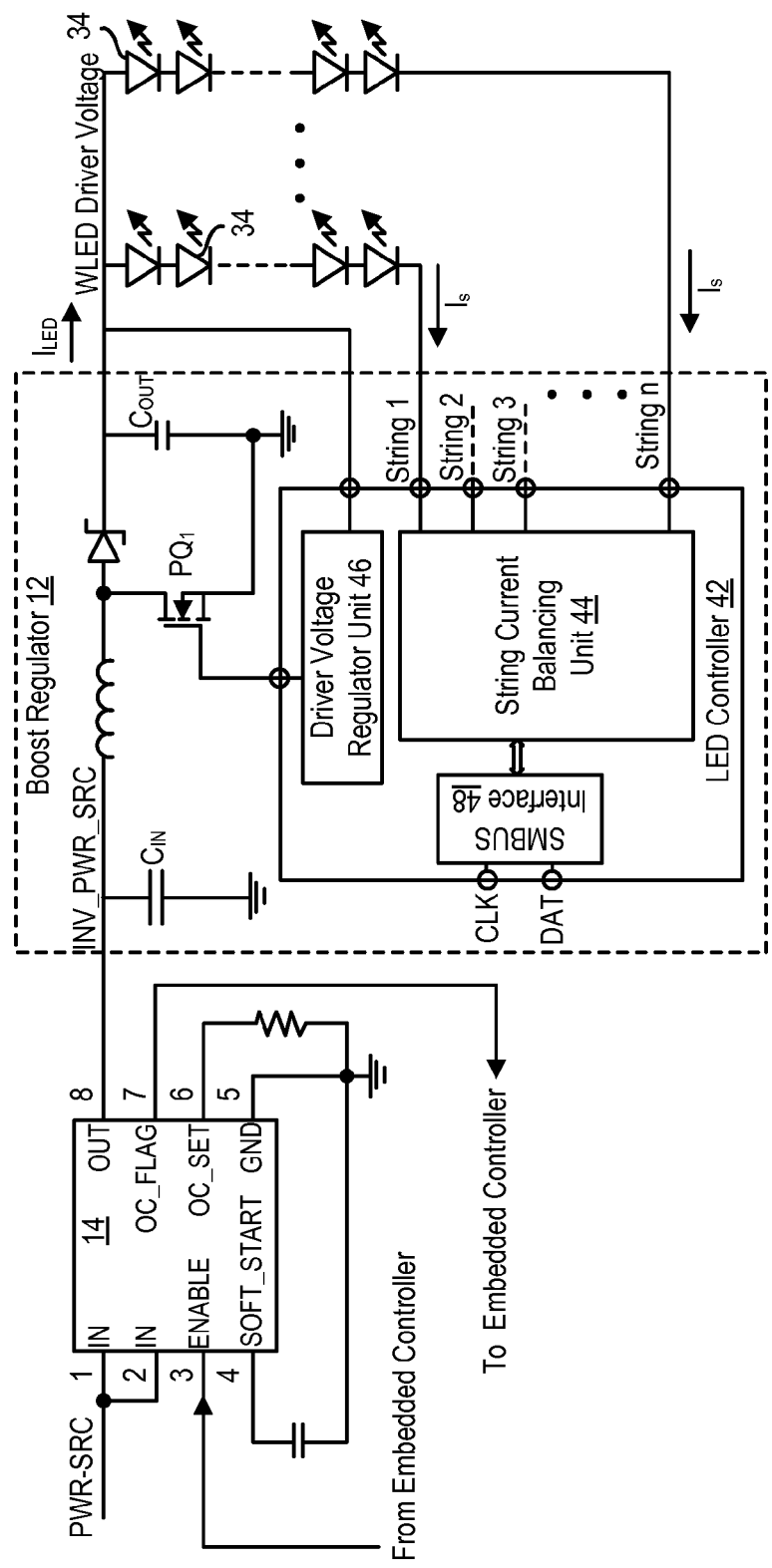
FIG. 2 depicts a circuit diagram of an LED boost regulator protected by a current limiting MOSFET.

Referring now to FIG. 2, a circuit diagram depicts an LED boost regulator 12 protected by a current limiting MOSFET 14. Power from a power source enters current limiting MOSFET 14 at pins 1 and 2 and exits at pin 8 to proceed to boost regulator 12. Boost regulator 12 boosts the voltage of direct current received from current limiting MOSFET 14 to a level used by LEDs 34. An LED controller 42 has a string current balancing unit 44 and driver voltage regulator control unit 46 that manage the current and voltage levels provided to LEDs 34 to achieve a brightness level input through a SMBus interface 48. An enable input accepted at pin 3 of current limiting MOSFET 14 switches power on and off to pin 8 based on an input from an embedded controller. A soft start input at pin 4 allows a graduated increase of voltage and current provided from pin 8. If an overcurrent condition occurs at current limiting MOSFET 14, current to pin 8 is automatically shut off and an overcurrent flag is sent from pin 7 to the embedded controller. For example, an overcurrent event might occur if a short develops at $PQ_1$, $C_{in}$ or $C_{out}$ of boost regulator 12 or any LED 34. After current to pin 8 is automatically shut off, a command from the embedded controller to pin 3 to turn off current at pin 8 provides additional security that the over current fault is corrected. MOSFET 14 is, for example, a commercially available MOSFET for protecting against excess power draw through a USB port that is modified for the higher voltage values associated with LED illumination and to output a flag if an overcurrent event occurs. Some commercially available MOSFETs are the SIP4610 from Vishay, the G5250 from Global Mixed Mode Technology or the TPS2062 from Texas Instruments.

Although the present invention has been described in detail, it should be understood that various changes, substitutions, and alterations can be made hereto without departing from the spirit and scope of the invention as defined by the appended claims.

What is claimed is:

1. An information handling system comprising:
   plural processing components operable to cooperate to process information;
   a display interfaced with the processing components and operable to present information;
   an LED backlight associated with the display and operable to illuminate the presented information;
   a power source operable to provide direct current power;
   a power regulator interfaced with the power source and operable to provide direct current to the backlight; and
   a current limiting MOSFET disposed between the power source and the power regulator and operable to switch off current from the power source to the power regulator if the current exceeds a predetermined limit.

2. The information handling system of claim 1 further comprising a power regulator monitor running on a processing component and interfaced with the current limiting MOSFET, the current limiting MOSFET providing an overcurrent alert to the power regulator monitor if the current exceeds the predetermined limit.

3. The information handling system of claim 2 wherein the power regulator monitor is operable to provide a predetermined end user indication in response to an overcurrent alert.

4. The information handling system of claim 3 wherein the overcurrent alert comprises a visual indication at the information handling system.

5. The information handling system of claim 3 wherein the overcurrent alert comprises a network communication from the information handling system to a predetermined network location.

6. The information handling system of claim 2 wherein the power regulator monitor is operable to turn off power to the power regulator in response to an overcurrent alert.

7. The information handling system of claim 2 wherein the processing component that supports the power regulator monitor comprises an embedded controller.

8. The information handling system of claim 1 wherein the LED backlight comprises a WLED.

9. The information handling system of claim 1 wherein the LED backlight comprises an RGB LED.

10. A method for powering an LED backlight, the method comprising:
    providing direct current from a power source at a first voltage to a boost regulator;
    boosting the direct current from the first voltage to a second voltage with the boost regulator;
    applying the direct current with the second voltage to the LED backlight; and
    monitoring the direct current with a current limiting MOSFET disposed between the power source and the boost regulator, the current limiting MOSFET shutting off power to the boost regulator if the direct current exceeds a predetermined limit.

11. The method of claim 10 further comprising issuing an overcurrent alert from the current limiting MOSFET if the direct current exceeds a predetermined limit.

12. The method of claim 11 further comprising:
    receiving the overcurrent alert at a controller; and shutting down the direct current from the power source to the boost regulator with the controller.

13. The method of claim 11 further comprising:
    receiving the overcurrent alert at a controller; and
    issuing an overcurrent indication to an end user.

14. The method of claim 13 wherein the overcurrent indication comprises a visual indicator.

15. The method of claim 13 wherein the overcurrent indication comprises a message initiated by the controller and sent through a network.

16. A system for powering an LED backlight, the system comprising:
    a regulator operable to accept direct current at an input and to provide direct current at an output, the direct current at the output having a voltage for powering the LED backlight; and
    a current limiting MOSFET operable to accept direct current from a power source and to output the direct current to the regulator input, the current limiting MOSFET further operable to automatically shut off the current to the regulator input if the current exceeds a predetermined limit.

17. The system of claim 16 wherein the current limiting MOSFET is further operable to issue an overcurrent alert.

18. The system of claim 16 wherein the current limiting MOSFET further comprises a control input operable to accept a control signal that selectively turns on and off the current to the regulator input.

19. The system of claim 18 wherein the current limiting MOSFET further comprises a soft start input operable to accept a control signal that turns on current to the regulator input at a predetermined rate.

20. The system of claim 16 wherein the current limiting MOSFET comprises a component adapted to couple to an information handling system motherboard.

* * * * *